(12) United States Patent
Sugata et al.

(10) Patent No.: US 6,547,498 B1
(45) Date of Patent: Apr. 15, 2003

(54) MACHINE TOOL

(75) Inventors: Shinsuke Sugata, Fukuyama (JP); Takashi Kobayashi, Fukuyama (JP)

(73) Assignee: Horkos Corporation, Hiroshima (JP)

( * ) Notice: Subject to any disclaimer, the term of this patent is extended or adjusted under 35 U.S.C. 154(b) by 0 days.

(21) Appl. No.: 09/720,291

(22) PCT Filed: Jun. 7, 1999

(86) PCT No.: PCT/JP99/03051

§ 371 (c)(1),
(2), (4) Date: Apr. 6, 2001

(87) PCT Pub. No.: WO99/67051

PCT Pub. Date: Dec. 29, 1999

(30) Foreign Application Priority Data

Jun. 23, 1998 (JP) ............................................ 10-193695

(51) Int. Cl.⁷ .............................. B23C 9/00; B23C 1/04; B23Q 11/08
(52) U.S. Cl. ........................ 409/134; 409/137; 409/212; 408/241 G; 29/DIG. 59; 29/DIG. 86; 29/DIG. 94
(58) Field of Search ................................. 409/134, 202, 409/212, 235, 137, 191; 408/241 G, 234; 29/DIG. 56, DIG. 59, DIG. 60, DIG. 86, DIG. 94, DIG. 102; 451/451; 160/20; 74/612

(56) References Cited

U.S. PATENT DOCUMENTS 3,786,846 A * 1/1974 Mehring ................. 29/DIG. 86
3,824,890 A * 7/1974 Zettler et al. ................ 409/134
4,290,717 A * 9/1981 Aslen ...................... 408/241 G
4,388,028 A * 6/1983 Bodin ..................... 408/241 G
4,621,407 A * 11/1986 Suzuki ........................ 409/235
5,611,137 A * 3/1997 Braun ......................... 409/202
6,068,431 A * 5/2000 Line ........................... 409/202

* cited by examiner

Primary Examiner—A. L. Wellington
Assistant Examiner—Erica E. Cadugan
(74) Attorney, Agent, or Firm—Venable LLP; John P. Shannon; Chad C. Anderson

(57) ABSTRACT

A machine tool comprises a bed 1 having longitudinal guiding tracks 7, 7 on upper faces of right and left side parts 4, 4 respectively, a cutting unit 2 hung and supported by the guiding tracks 7, 7, moving in a longitudinal direction, and having a cutting part at its front, and a work fixing table 3 integrally attached on the bed 1, cover faces provided between the cutting unit 2 and the work fixing table 3 to surround an upper face as well as right and left side faces of the cutting part 2, and a cover device 14 forming a working space with only the bottom open relative to the cover faces, the work fixing table 3 and the cutting unit 2, wherein right and left side faces "d", "d" of the cover faces hang below the guiding tracks 7, 7 inside the right and left side parts 4, 4 of the bed 1.

6 Claims, 5 Drawing Sheets

MACHINE TOOL

FIELD OF THE INVENTION

The present invention relates to a machine tool having a cutting unit which moves in a longitudinal direction.

BACKGROUND OF THE INVENTION

A machine tool has been already known, which comprises a bed, longitudinal guiding tracks formed on the bed, a cutting unit moving in a longitudinal direction along the guiding tracks, and a cutting part (including a spindle axle and a cutting edge) formed in front of the cutting unit for processing a work.

This kind of machine tool has a cover device to prevent cutting chips from splashing, but can not prevent them from failing and attaching on the guiding tracks.

Accordingly, another exclusive cover is provided to surround the above-mentioned guiding tracks. This cover is retractable in order to move the cutting unit in a longitudinal direction, made of metal so as to bear heated cutting chips.

The present invention seeks to provide a machine tool which does not need an exclusive cover to surround the above-mentioned guiding tracks.

SUMMARY OF THE INVENTION

To achieve the above object, the present invention is characterized by a machine tool comprising a bed having right and left side parts and a longitudinal guiding track formed on an upper face of each right and left side part, a cutting unit hung and supported by the guiding tracks, moving in a longitudinal direction, and having a cutting part at its front, and a work fixing table integrally attached on the bed. In addition, cover faces are provided between the cutting unit and the work fixing table to surround an upper face as well as right and left side faces of the cutting part, and a cover device is provided to form a working space with only the bottom open relative to the cover faces, the work fixing table and the cutting unit. Here, right and left side faces of the cover faces hang below the guiding tracks inside the right and left side parts of the bed.

The above-mentioned cover device, work fixing table, and cutting unit define a working space and prevent cutting chips generated therein from splashing outside, leading them downward between the right and left side parts of the bed. Therefore, the cutting chips do not splash towards the right and left guiding tracks nor deposit near the guiding tracks, where cleaning is hard.

The above-mentioned invention is concreted as follows.

That is to say, the cover device is engaged to either the cutting unit or the work fixing table. Therefore, a particular supporting system is not necessary to support the cover device.

Moreover, a cutting chips carrying device is provided downward between the right and left side parts of the bed to receive the cutting chips and carry them to a fixed place in the outside. Therefore, the cutting chips generated during processing are completely and promptly taken out completely and promptly without treatments such as sweeping and gathering.

According to the above-mentioned present invention, as no heated cutting chips contact with the guiding tracks, the machine tool does not need an exclusive cover for the guiding tracks to prevent the cutting chips from depositing and attaching thereto. Besides, as the cover device leads the cutting chips to fall downward between the right and left side faces of the bed, the cutting chips are hardly scattered, thereby effecting an easy cleaning of the cutting chips after the work is over.

Moreover, it is preferable to provide a safety cover near the guiding tracks to avoid any danger at an operating part. However, it is not necessary to provide it a countermeasure against heat like one necessary for a cover for heated cutting chips. Consequently, a simple cover is sufficient for this machine tool. Furthermore, a supporting system to support the cover device is simple by using the cutting unit and the work fixing table. In addition, it is possible to completely and rapidly remove the cutting chips produced during the process without sweeping and gathering them from every corner of the machine tool.

PREFERRED EMBODIMENTS OF THE PRESENT INVENTION

Figure 1:
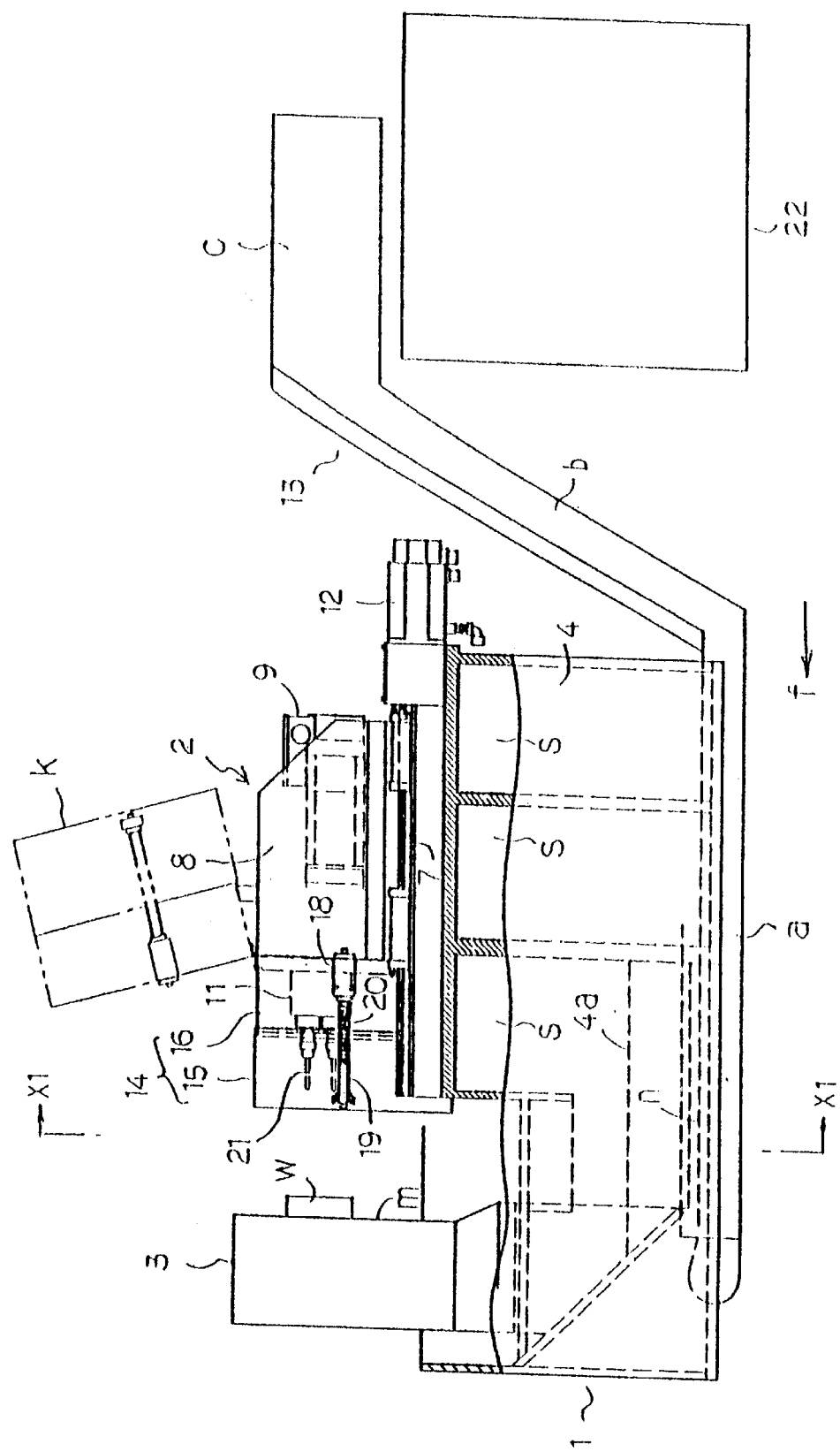
FIG. 1 is a side view, showing an example of a machine tool having a multi spindle heads, according to the present invention.

The present invention, as shown in these figures, comprises a bed 1, a cutting unit 2, and a work fixing table 3.

The above bed 1 comprises right and left side parts 4, 4 as well as a front face 5 and a rear face 6 each combining the side parts 4, 4. Besides, longitudinal guiding tracks 7, 7 are provided on each upper face of the above side parts 4, 4.

In this case, each side part 4 combines its vertical and lateral faces to compose a strong rigid face structure having a space "s" thereiniside. A guide plate 4a for cutting chips is obliquely fixed to each side part 4.

The above cutting unit 2 comprises a unit flame 8 moving in a longitudinal direction along the right and left guiding tracks 7, 7, a motor 9 fixed on this flame 8, and a cutting part 11 having plural spindles 10 driven by the motor 9.

The work fixing table 3 is fixed on the bed 1 to grip a work "w" on a side face "m" facing the cutting unit 2.

A drive unit 12 is fixed to the rear of the bed 1 to displace the cutting unit 2 in a longitudinal direction. As this drive unit 12, for instance, a electric motor or a hydraulic cylinder is used.

A cutting chips carrying device 13 is integrated into the bed 1 and provided downward between the right and left side parts 4, 4 thereof, comprising a comparatively long horizontal carrier starting end "a", an oblique carrier path "b", and a comparatively short horizontal carrier finishing end "c". A carrier band "n" moves from the carrier starting end "a" to the carrier finishing end "c".

A cover device 14 is provided between the cutting unit 2 and the work fixing table 3 to prevent cutting chips from splashing.

This cover device 14 is formed as the following.

That is to say, the cover device 14, having cover faces to surround an upper face and right and left side faces of the cutting part 11, comprises a front end cover 15 and a back end cover 16. A back upside of the back end cover 16 is combined with an upper face of the Cutting unit 2 through hinges 17 so that both the covers 15, 16 can be supported by the cutting unit 2 as well as rock and open upwardly as the whole.

Figure 5:
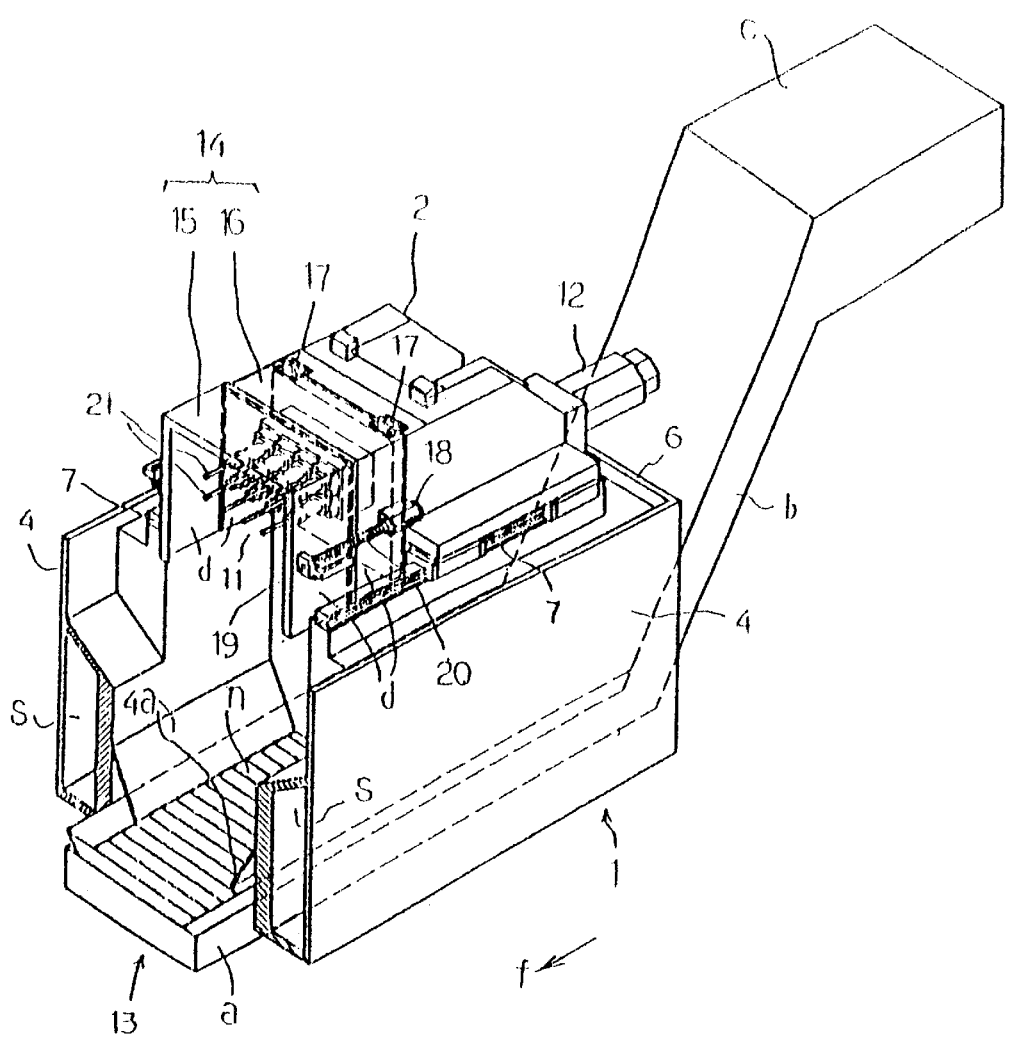
FIG. 5 is a perspective view taken along the line X1—X1 in FIG. 1.

The front end cover 15 is slidably fixed to the back end cover 16. In this case, it is important that right and left side faces "d", "d" of each cover 15, 16 hang down to a position below the guiding tracks 7, 7 inside the right and left side parts 4, 4 of the bed 1 (vide FIG. 5).

Cylindrical members 18, 18 are horizontally secured to the outsides of the right and left side faces "d", "d" of the back end cover 16. Supporting sticks 19, 19 are slidably inserted into these cylindrical members 18, 18, and ends of these supporting sticks 19, 19 are combined with corresponding outsides of the right and left side faces "d", "d" of the front end cover 15 by means of engaging pieces, and a compressing spring 20 is external mounted on a part of each supporting stick 19 between a tip thereof and the cylindrical member 18.

In this case, the front end cover 15 is composed so as to move to the forefront against the back end cover 16 by elasticity of the compressing spring 20 on condition that no backward external force affects the front end cover 15.

A cutting edge 21 and a container 22 for cutting chips are illustrated in figures respectively.

Examples and operations for the above-mentioned machine tool according to the present invention are explained as the following.

Figure 3:
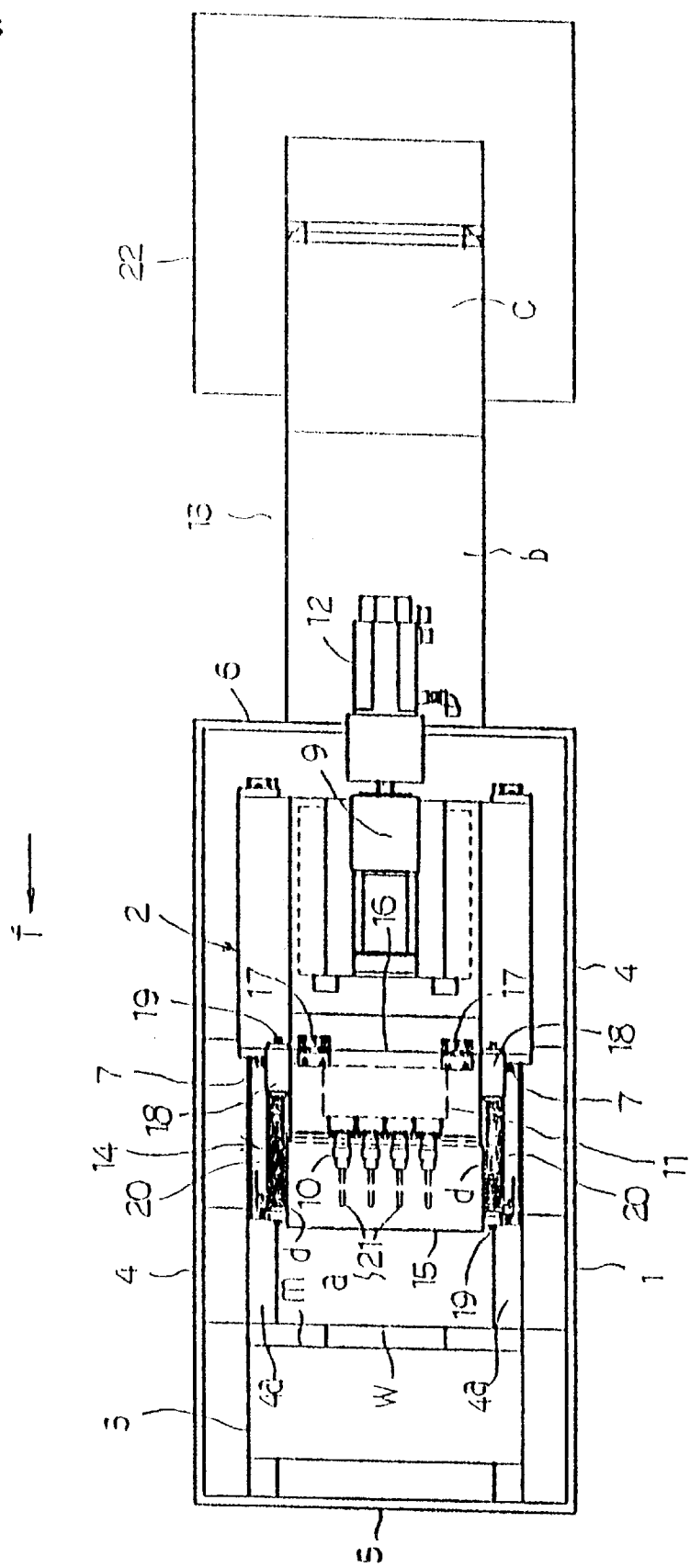
FIG. 3 is a plan view of the machine tool in FIG. 2.
Figure 4:
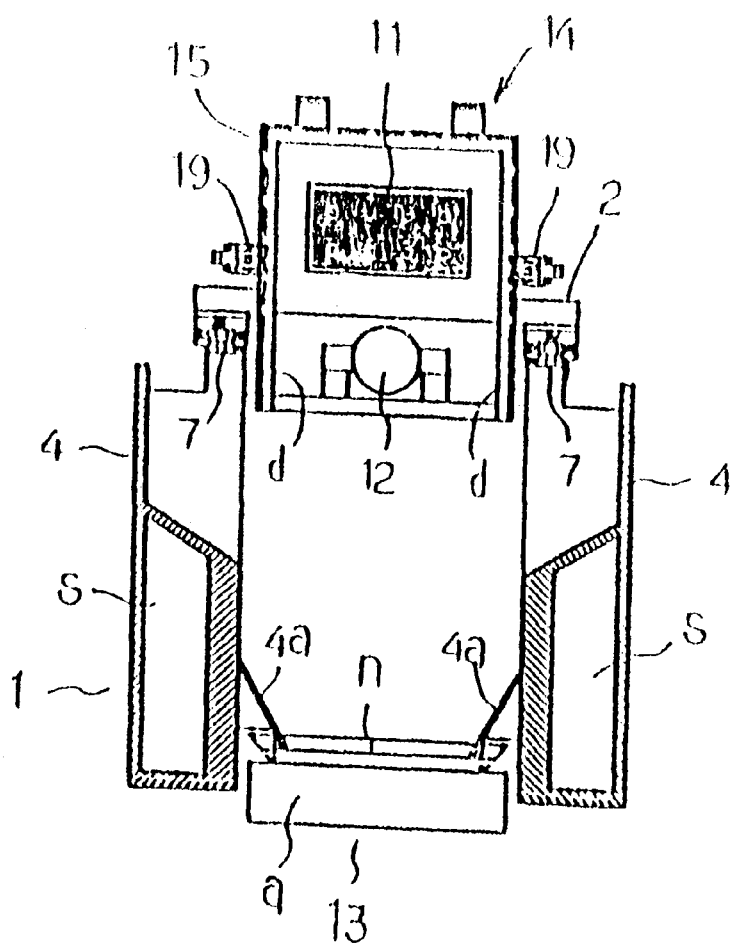
FIG. 4 is a cross sectional view taken along the line X1—X1 in FIG. 1.

First of all, as shown FIG. 1 and FIG. 3, the cutting unit 2 is moved to the aftermost, wherein a tip end of the front end cover 15 is away from the work fixing table 3.

Under this condition, in response to necessity, the cover device 14 is pulled from a position showed by a full line up to a position showed by a virtual line "k" in FIG. 1, turning around the hinge 17. At this time, the cover device 14 can remain there owing to gravity.

The above displacement enables the cutting part 11 to appear outward. Under this condition, a necessary cutting edge 21 is fixed to each spindle 10 or a fixed cutting edge 21 is exchanged. After finishing necessary treatments, the cover device 14 is returned to the full line position in FIG. 1.

On the other hand, a work "w", as shown in FIG. 1, is fixed on the work fixing table 3 through a mutual space between the work fixing table 3 and the front end cover 15. Thereafter, a work starting order is inputted to a control device which is not illustrated. Therefore, the motor 9 for driving the spindle 10 spins a plurality of spindles 10 and the cutting edge 21. The drive unit 12 for displacing the cutting unit 2 moves the cutting unit 2 and the cover device 14 to a forward direction "f".

Figure 2:
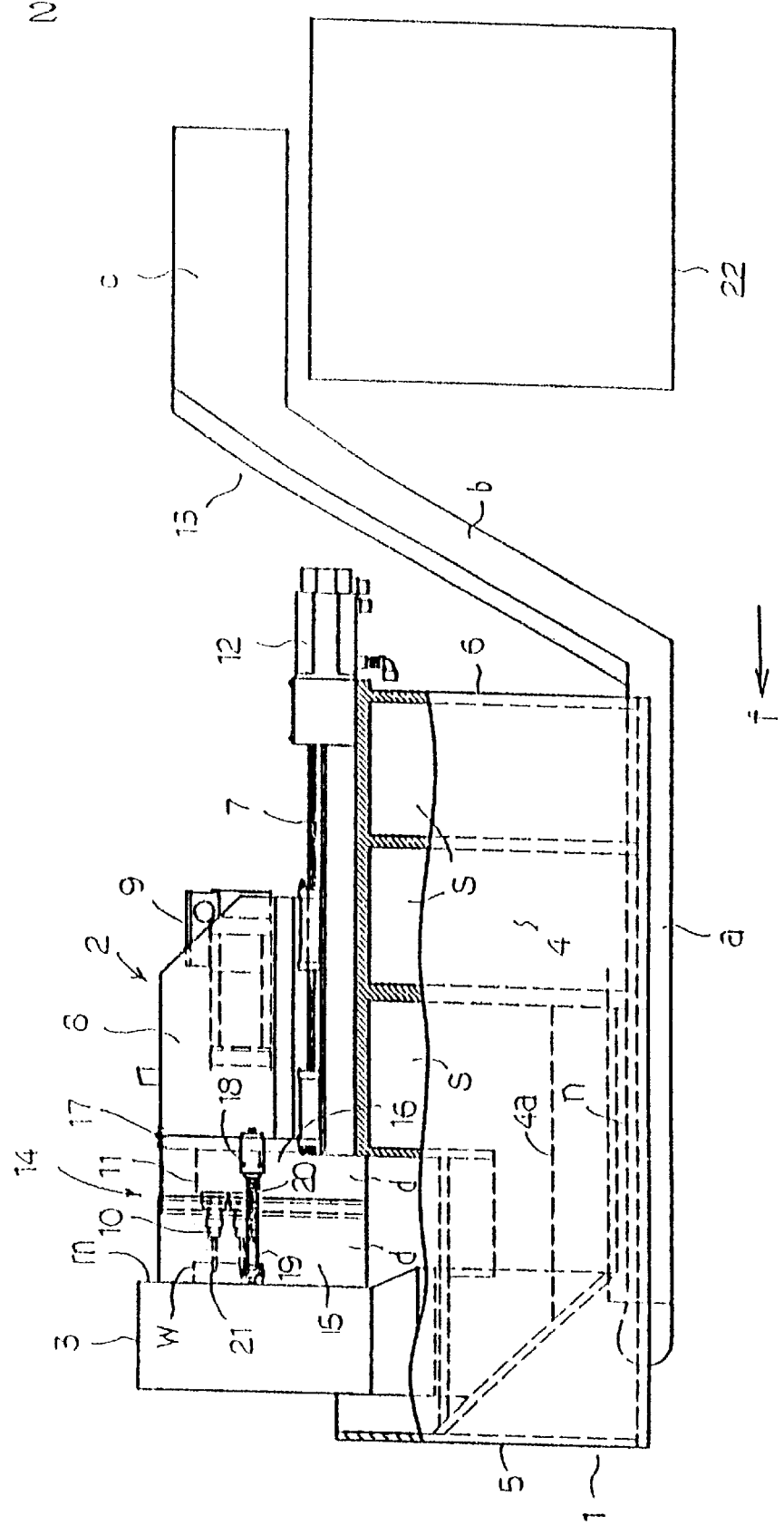
FIG. 2 is a side view showing a different example of the machine tool having the multi spindle heads, according to the invention.

When the cutting unit 2 is displaced forward for a fixed distance, as shown in FIG. 2, a front end of the front end cover 15 touches at a face "m" of the work fixing table 3. Therefore, the front and rear end-faces of the cover device 14 are covered with the work fixing table 3 and the cutting unit 2, respectively, to form a working space with only the bottom open. A work "w" locates therein.

When the cutting unit 2 is displaced further to the forward "f", the front end cover 15 is pressed for only this displaced distance to the work fixing table 3 against elasticity of the compressing spring 20, thereby increasing an overlapped length with the back end cover 16 as well as shortening an overall length of the cover device 14.

As the cover device 14 is shortened, the cutting edge 21 of the cutting part 11 reaches the work "w", and starts processing it. Because of this processing, cutting chips are produced and splashed from the work "w" in accordance with revolutions of the cutting edge 21 and the spindle 10. These splashed cutting chips fall downward along the peripheral faces of the above working space.

The cutting chips fall downward between the right and left side parts 4, 4 of the bed 1, and reach on the carrier face "n" of the carrier starting end "a" of the cutting chips carrying device 13. Therefore, the cutting chips do not fall on nor attach to the right and left guiding tracks 7, 7 as well as the neighborhood thereof, which are located outside the cover device 14 and above the lower edges of each right and left side face "d", "d" of the cover face.

The cutting chips deposited on the carrier face "n" reach the carrier finishing end "c" through the oblique carrier path "b" by displacing the carrier face "n", and fall into a container 22 therefrom.

When cutting the work "w" is thus finished, the drive unit 12 for displacing the cutting unit 2 works conversely to the former. Accordingly, each cover 15, 16 of the cover device 14 are displaced conversely to the former, returning to the state of FIG. 1. Then, the motor 9 for driving the spindle 10 stops.

Thereafter, a processed work "w" is removed, and one process comes to an end. The same treatments and operations follow.

The above embodiment can be modified as the following.

That is to say, in the above embodiment the cover device 14 has cover faces formed by the front end cover 15 and the back end cover 16. In place of this, it is possible to insert and instal one or plural another intermediate covers between the front end cover 15 and the back end cover 16. These cover faces can be slid to an adjacent cover. This organization is available when a longitudinal size of the cover device 14 is long.

Moreover in place of the cylindrical member 18, the supporting stick 19 and the compressing spring 20, it is possible to equip a cylinder device having the same actions as them. In this case, the cover device 14 is extended or retracted by power of the cylinder device.

Furthermore, in the above embodiment, the cutting unit 2 supports the cover device 14. However, in place of this, it is possible to make the work fixing table 3 support the cover device 14. That is to say, for example, turning the cover device 14 conversely, the back end cover 16 is combined with the work fixing table 3 by means of hinges. In this case, the work "w" is removed from the work fixing table 3 when the cover device 14 is turned upward around hinges.

Cylindrical members 18, 18 are horizontally secured to the outsides of the right and left side faces "d", "d" of the back end cover 16. Supporting sticks 19, 19 are slidably inserted into these cylindrical members 18, 18, and ends of these supporting sticks 19, 19 are combined with corresponding outsides of the right and left side faces "d", "d" of the front end cover 15 by means of engaging pieces, and a compressing spring 20 is external mounted on a part of each supporting stick 19 between a tip thereof and the cylindrical member 18.

In this case, the front end cover 15 is composed so as to move to the forefront against the back end cover 16 by elasticity of the compressing spring 20 on condition that no backward external force affects the front end cover 15.

A cutting edge 21 and a container 22 for cutting chips are illustrated in figures respectively.

Examples and operations for the above-mentioned machine tool according to the present invention are explained as the following.

First of all, as shown FIG. 1 and FIG. 3, the cutting unit 2 is moved to the aftermost, wherein a tip end of the front end cover 15 is away from the work fixing table 3.

Under this condition, in response to necessity, the cover device 14 is pulled from a position showed by a full line up to a position showed by a virtual line "k" in FIG. 1, turning around the hinge 17. At this time, the cover device 14 can remain there owing to gravity.

The above (displacement enables the cutting part 11 to appear outward. Under this condition, a necessary cutting edge 21 is fixed to each spindle 10 or a fixed cutting edge 21 is exchanged. After finishing necessary treatments, the cover device 14 is returned to the full line position in FIG. 1.

On the other hand, a work "w", as shown in FIG. 1, is fixed on the work fixing table 3 through a mutual space between the work fixing table 3 and the front end cover 15. Thereafter, a work starting order is inputted to a control device which is not illustrated. Therefore, the motor 9 for driving the spindle 10 spins a plurality of spindles 10 and the cutting edge 21. The drive unit 12 for displacing the cutting unit 2 moves the cutting unit 2 and the cover device 14 to a forward direction "f".

When the cutting unit 2 is displaced forward for a fixed distance, as shown in FIG. 2, a front end of the front end cover 15 touches at a face "m" of the work fixing table 3. Therefore, the front and rear end-faces of the cover device 14 are covered with the work fixing table 3 and the cutting unit 2, respectively, to form a working space with only the bottom open. A work "w" locates therein.

When the cutting unit 2 is displaced further to the forward "f", the front end cover 15 is pressed for only this displaced distance to the work fixing table 3 against elasticity of the compressing spring 20, thereby increasing an overlapped length with the back end cover 16 as well as shortening an overall length of the cover device 14.

As the cover device 14 is shortened, the cutting edge 21 of the cutting part 11 reaches the work "w", and starts processing it. Because of this processing, cutting chips are produced and splashed from the work "w" in accordance with revolutions of the cutting edge 21 and the spindle 10. These splashed cutting chips fall downward along the peripheral faces of the above working space.

The cutting chips fall downward between the right and left side parts 4, 4 of the bed 1, and reach on the carrier face "n" of the carrier starting end "a" of the cutting chips carrying device 13. Therefore, the cutting chips do not fall on nor attach to the right and left guiding tracks 7, 7 as well as the neighborhood thereof, which are located outside the cover device 14 and above the lower edges of each right and left side face "d", "d" of the cover face.

The cutting chips deposited on the carrier face "n" reach the carrier finishing end "c" through the oblique carrier path "b" by displacing the carrier face "n", and fall into a container 22 therefrom.

When cutting the work "w" is thus finished, the drive unit 12 for displacing the cutting unit 2 works conversely to the former. Accordingly, each cover 15, 16 of the cover device 14 are displaced conversely to the former, returning to the state of FIG. 1. Then, the motor 9 for driving the spindle 10 stops.

Thereafter, a processed work "w" is removed, and one process comes to an end. The same treatments and operations follow.

The above embodiment can be modified as the following.

That is to say, in the above embodiment the cover device 14 has cover faces formed by the front end cover 15 and the back end cover 16. In place of this, it is possible to insert and instal one or plural another intermediate covers between the front end cover 15 and the back end cover 16. These cover faces can be slid to an adjacent cover. This organization is available when a longitudinal size of the cover device 14 is long.

Moreover in place of the cylindrical member 18, the supporting stick 19 and the compressing spring 20, it is possible to equip a cylinder device having the same actions as them. In this case, the cover device 14 is extended or retracted by power of the cylinder device. Furthermore, in the above embodiment, the cutting unit 2 supports the cover device 14. However, in place of this, it is possible to male the work fixing table 3 support the cover device 14. That is to say, for example, turning the cover device 14 conversely, the back end cover 16 is combined with the work fixing table 3 by means of hinges. In this case, the work "w" is removed from the work fixing table 3 when the cover device 14 is turned upward around hinges.

What is claimed is:

1. A machine tool comprising:

a bed having right and left side parts and a longitudinal guiding track formed on an upper face of each right and left side part;

a cutting unit hung and supported by said guiding tracks, moving in a longitudinal direction, and having a cutting part at its front constantly at a level above said guiding tracks;

a work fixing table integrally attached on said bed;

a cover device having cover faces provided between said cutting unit and said work fixing table to surround an upper face as well as right and left side faces of the cutting part, the cover device forming with said work fixing table and said cutting unit a working space having only a bottom open, wherein right and left side faces of said cover faces hang below the guiding tracks, between the right and left side parts of said bed.

2. A machine tool as set forth in claim 1, wherein said cover device is engaged to said cutting unit.

3. A machine tool as set forth in claim 2, wherein a cutting chips carrying device is provided under the right and left side faces to receive the cutting chips and carry them to a fixed place outside said machine tool.

4. A machine tool as set forth in claim 1, wherein a cutting chips carrying device is provided under the right and left side faces to receive the cutting chips and carry them to a fixed place outside said machine tool.

5. A machine tool as set forth in claim 1, wherein said cover device is engaged to said work fixing table.

6. A machine tool as set forth in claim 5, wherein a cutting chips carrying device is provided under the right and left side faces to receive the cutting chips and carry them to a fixed place outside said machine tool.

* * * * *